Figure 1:
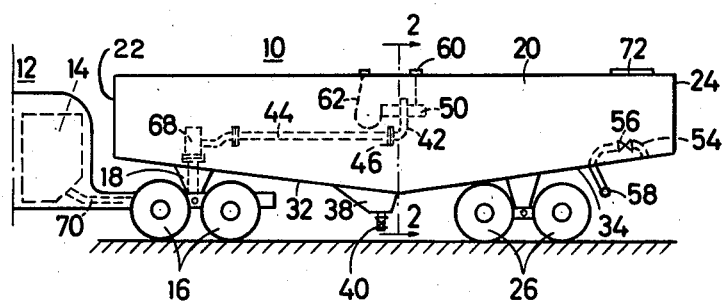

July 13, 1965  K. SJÖBLOM  3,194,442
TANK VEHICLE
Original Filed March 28, 1960

INVENTOR.
KAI SJÖBLOM
BY
Young + Thompson
ATTYS.

United States Patent Office 3,194,442
Patented July 13, 1965

3,194,442
TANK VEHICLE
Kai Sjöblom, Rindogatan 5, Stockholm, Sweden
Continuation of application Ser. No. 17,934, Mar. 28, 1960. This application Mar. 4, 1963, Ser. No. 262,788
Claims priority, application Sweden, Apr. 2, 1959, 3,159/59
3 Claims. (Cl. 222—176)

This is a continuation of my copending U.S. patent application Ser. No. 17,934, filed March 28, 1960, now abandoned.

The present invention relates to fuelers for aircraft, particularly of the type used for rapid fueling of large airplanes in airports, and preferably for jet aircraft.

The fuel used for jet engines is mainly of the petroleum types (JP-1 and JP-4) and these "jet fuels" require a considerably longer time for "settling" than fuels for aero piston engines, i.e. fuels of the high octane gasoline type. In this connection the term "settling" may be explained as follows:

Fuel of the types referred to and particularly fuel of the petroleum type contains water to a certain extent. As a result of varying temperature conditions between the outer atmosphere, the wall of the tank and the fuel, condensation and precipitation of water deriving from the water contents of the fuel occur at the inner wall of the tank. During motions of the tank, for example from a fueler filling stand to the aircraft, said condensed or precipitated water becomes mixed with the fuel. Such water occurring in the fuel has on many occasions caused engine troubles sometimes causing catastrophes. It is a main condition that fuel supplied to aircraft be free from water (only 0.02% of the weight of water maximum is allowed by, for instance, Rolls Royce for jet engines), and therefore the tank containing the fuel must be at rest for a period of time sufficient to permit the water to sink so that water-free fuel may be supplied to the tanks of the aircraft. The time required for the water to sink to the bottom of the conveying tank is termed the "settling time." The primary object of the invention is to provide a tank for fuelers having a shape providing a minimum of settling time for the water contents in the fuel of the tank.

A further object of the invention is to obtain a fueler which is particularly suitable for aircraft propelled by jet engines. Such engines have a greater consumption of fuel per unit of time than piston engines. Thus, the former types of engines require considerably augmented tanks and, as a consequence, fueling tanks of greater capacity.

It is clear from the above that the main jet fuels, i.e., JP-1 and JP-4, require a longer settling time than that of the aero piston engines using aviation gasoline and also that the jet engine consumes greater quantities of fuel than the piston engines so that the requirements of water separating means for jet aircraft and the capacity thereof are more stressed. A further object of the invention is to comply with these requirements and to overcome the difficulties connected with the construction of a water separation system to be used in a conveyable fueler of great capacity.

Figure 2:
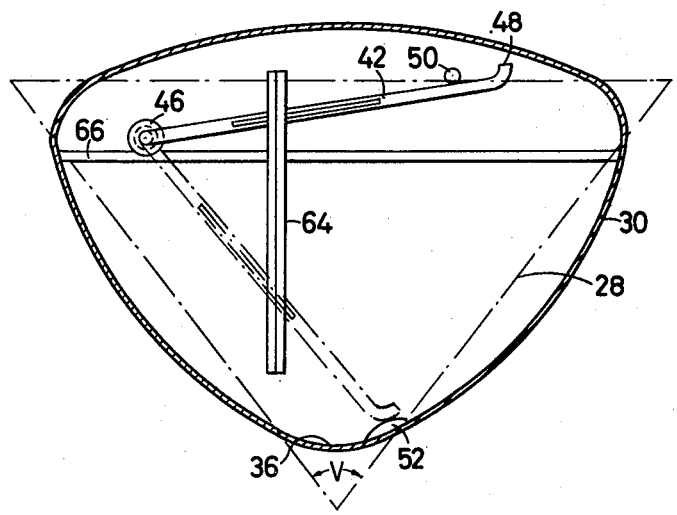

The above and other objects that may become apparent as the description proceeds are attained by a construction and arrangement of parts that will be described hereinafter, reference being had to the accompanying drawings showing a preferred embodiment of the invention and in which FIGURE 1 is a vertical elevation of the fueler and part of a traction car or truck belonging thereto, and FIGURE 2 is a transverse section along the central plane of the tank of the fueler on an enlarged scale.

The fueler shown in the drawing comprises a tank generally designated by 10 and a truck or lorry 12 carrying the fore part of the tank. Only the aft part of the truck enclosing a pump unit 14 is illustrated. Said part includes a wheel bogie 16 carrying a support member 18 secured to the bottom of the fore part of the tank.

The tank comprises an oblong shell 20 and opposite ends 22, 24. It is provided with supporting means in the form of a wheel bogie 26 carrying the aft portion of the tank. The supporting means at the fore and aft parts carry the tank in a lying or substantially horizontal position.

The shell of the tank is broadly tubular but not cylindrical. The inner cross-section of the tank varies from one end thereof to the other, i.e., it is different at different points between the end walls. One cross section has broadly the main shape of a triangle having one apex pointing downwardly. In the embodiment illustrated in the drawing this cross section is located midway between the ends of the tank, but in practice it may be situated nearer one end than the other. Thus, the substantially triangular cross-section should be located between the end walls at a suitable point but the location at the middle of the tank is preferred. The theoretical form of the cross section in view is indicated with chain-dotted lines as a triangle 28, in which the downwardly pointing angle $v$ should be rather small, i.e., less than 90° and preferably not exceeding 60°. This involves the provision of steep sides for the tank at the cross section in view, which contributes to an improved water separating effect and collection of the water in the bottom of the tank. The broadly triangular shape also contributes to a stiff tank structure, and as a result no reinforcing beams are needed at the bottom portion of the tank which thus may be clean from projecting elements which could form pockets for the water and prevent its settling at the bottom of the tank. In practice, and with regard to the strength of the shell, the cross section may be made with rounded convex sides and top as indicated by the full line 30 in FIG. 2, i.e., the cross section takes the preferred main shape of a cardia.

As shown in FIG. 1 the bottom of the tank is indicated by two straight lines 32, 34 slanting to the cross section 2—2 shown in FIG. 2 and described hereinbefore. The top is indicated by a single straight line. The angle between each bottom line and the horizontal should exceed a predetermined value which in case of such oil as jet fuel should not be less than about 7°. Due to this slanting bottom and the steep sides of the tank, there is formed a sump 36 at the lowest point of the section 2—2 which represents the greatest cross section of the tank. The sump 36 may be completed with an additional sump 38 having a water drainage valve 40 as shown in FIG. 1.

The discharge means for the fuel comprise a movable suction arm or pipe 42 connected to a stationary pipe 44 by a swivel joint 46 permitting the suction arm to swing in the vertical plane including the maximum cross-section of the tank. The tubular suction arm has a suction mouth 48 at its free end and is connected with a float 50 adapted to keep the mouth near the level of the fuel in the tank. In its lowest position the suction arm 42 has its end resting on a bottom projection 52 as shown by chain-dotted lines in FIG. 2. The suspensions of the suction arm as described result in a stiff and safe construction.

The shape of the tank indicated hereinbefore and the location of the discharge arm so as to be able to swing in the maximum cross section of the tank enable safe removal of fuel from the tank to a high percentage of the total inner volume thereof. Thus, only 3⅓% of said volume will be located below the mouth of the suction arm in the lowest position thereof, and therefore it is possible to safely deliver continuously up to about 96% of the contents of the tank. A further advantage relates to the fact that in the case of daily (not continuous fueling service night and day) delivered volumes, there is no need for a separate stationary settling tank even where the tank contains jet fuel. Further, it is to be noted that no water separators for removing condensed or precipitated water are necessary in using the tank structure and discharge means described hereinbefore, provided the settling time after each filling does exceed 10 minutes and provided a drain sample taken after said settling gives a negative result when tested for water.

Further details suitable in practice are a loading conduit 54 containing a non-return valve 56 and a quick coupling half 58 for connection to a loading hose. The float 50 of the suction arm may be combined with a level indicator 60 enabling the operator to ascertain the contents of the tank accurately at any time during the supply to an aircraft. A control chain 62 could be connected with the float as shown in FIG. 1, and a vertical guide 64 may be provided for the suction arm. The discharge pipe 44 may be secured to a transverse stay 66 near the top of the tank, and furthermore said pipe 44 is shown in FIG. 1 as being connected to a vertical tube 68 carried through the support member 18 and connected with the pump unit 14 by a pipe 70 in the truck 12. A dome lid 72 may be mounted on the top of the tank at the rear end thereof.

The drainage valve 40 may be mounted on a substantially horizontal and tubular discharge arm leading from the bottom of the sump 38.

What I claim is:

1. In a tank vehicle, a transversely curved elongated tank body tapering continuously longitudinally from a maximum cross section thereof located between the ends of the tank body and toward both ends of the tank body, the cross sectional shape of the tank body varying progressively from said maximum cross-section to both ends thereof to provide a curved bottom portion of said tank body sloping gradually downwardly from both ends thereof to said maximum section, drainage means at the bottom of the tank body substantially below said maximum cross-section, and means to discharge the tank body including a tubular arm and a float secured to said arm, the arm being pivoted at one end and having a mouth at its other end at a water safety distance from the inner bottom wall of the tank body, the pivot enabling the arm to swing from a bottom position having its mouth near the said bottom wall at the maximum cross-section of the tank body to the top thereof and vice versa.

2. A tank vehicle, comprising a transversely curved elongated tank body tapering continuously longitudinally from a maximum cross-section thereof having the shape like the contour of a cardia and located near the middle of the length of the tank body to the ends of the tank body, the cross-sectional shape of the tank body varying progressively from said maximum section to both ends thereof to provide a curved bottom portion of said tank body sloping gradually downwardly from both ends thereof to said maximum cross-section, drainage means below said maximum section for discharge of water separated from the contents of the tank, separate product discharge means for discharging the remainder of the said contents, means for adjusting the intake height of the last-named means, and means in front of and behind said maximum cross-section for carrying the tank body.

3. In a tank vehicle as claimed in claim 1, further including a support on the inner bottom wall of the tank body for the free end of the pivoted arm to define a lowest position of its mouth, permitting only about 96% of the total volume of the tank to be discharged through the discharge means.

References Cited by the Examiner
UNITED STATES PATENTS

| | | | |
|---|---|---|---|
| 814,880 | 3/06 | Small et al. | |
| 1,369,239 | 2/21 | Gulick. | |
| 2,160,477 | 5/39 | Kramer. | |
| 2,526,520 | 10/50 | Von Saspe | 222—464 |
| 2,681,748 | 6/54 | Weller | 222—195 |
| 2,780,369 | 2/57 | Kaney | 222—195 X |
| 2,832,512 | 4/58 | Brooks | 222—405 X |
| 3,003,775 | 10/61 | Ackley | 222—176 X |

LOUIS J. DEMBO, *Primary Examiner.*

RAPHAEL M. LUPO, *Examiner.*